United States Patent [19]

Brown

[11] 3,985,890

[45] Oct. 12, 1976

[54] PICKLED SEAFOOD

[76] Inventor: Ethel A. Brown, P.O. Box 305, Hoodsport, Wash. 98548

[22] Filed: Apr. 7, 1975

[21] Appl. No.: 565,404

[52] U.S. Cl. ............................... 426/324; 426/332; 426/335; 426/643; 426/402; 426/523
[51] Int. Cl.$^2$ .............................................. A21D 4/00
[58] Field of Search ........... 426/332, 643, 652, 324, 426/325, 326, 129, 335, 321, 397, 402, 506, 509, 523

[56] References Cited
UNITED STATES PATENTS

| 205,830 | 7/1878 | Bliss | 426/332 |
|---|---|---|---|
| 2,381,019 | 8/1945 | Webb | 426/332 |
| 2,538,310 | 1/1951 | Hansen | 426/332 |
| 2,554,625 | 5/1951 | McFee | 426/325 |
| 3,852,486 | 12/1974 | Walker | 426/332 |

FOREIGN PATENTS OR APPLICATIONS

| 2,042,018 | 3/1972 | Germany | 426/324 |

OTHER PUBLICATIONS

Condensed Chemical Dictionary, 8th Ed., Hawley, Van Nostrand Reinhold Co., N.Y., 1971, p. 795.

Primary Examiner—Hiram H. Bernstein
Attorney, Agent, or Firm—Thomas W. Secrest

[57] ABSTRACT

This invention is for a pickled seafood and the method of preparing the pickled seafood. The shelf life of the pickled seafood at the ambient temperature and with no refrigeration, is, approximately, 2 to 3 years.

1 Claim, No Drawings

PICKLED SEAFOOD

GENERAL BACKGROUND OF THE INVENTION

From experience, I have found that many people I know like pickled seafood. For example, at parties, taverns, cocktail lounges and on special occasions, these people like to eat pickled seafood.

In the stores I have found different pickled seafoods. It has been necessary to keep these pickled seafoods refrigerated so as to lessen the possibility of spoiling.

With this background of having eaten and like pickled seafoods and knowing that pickled seafoods must be refrigerated, I started experimenting with preparing a pickled seafood. After using many combinations of foods, and processes, I developed the subject invention whereby it is possible to prepare a pickled seafood which will keep at ambient temperature for a period of time longer than two or three years. This eliminates the necessity of having to refrigerate the pickled seafood. As a result, it is easier to display the pickled seafood for possible purchase by customers and also for storage of the seafood.

GENERAL DESCRIPTION OF THE INVENTION

In preparing the pickled seafood I first reduce it down to a reasonable size which can be eaten in one or two or three bites. If the seafood is large in size, then it is necessary to reduce its size to an easily handled discrete piece. If the seafood is of a nominal size, such as an oyster, the whole oyster can be processed.

The cooked seafood is prepared by adding spices and various preservatives in an aqueous solution. After the seafood has been cooked, then it can be packed into containers or jars as a cold pack. The cold pack seafood can be stored at ambient temperature for 2 or 3 months.

Another step is to pack the seafood into the container and then cook the seafood in the container so as to have a hot pack. From experience, the hot pack can be stored at ambient temperature for longer than 2 or 3 years.

It is to be realized that both the cold pack and the hot pack are sealed to prevent deterioration of the pickled seafood.

THE OBJECTS AND ADVANTAGES

An object of this invention is to provide a process for making a tasty pickled seafood; another object is to provide such a process which can be conducted in a large scale operation; a further object is to provide a pickled seafood which is attractive in appearance and pleasing to the eye; an additional object is to provide such a process which can use readily available apparatus; a further and important object of this invention is to provide a method for making a pickled seafood and which pickled seafood can be stored at ambient temperature for a relatively long period of time; and, to provide a process which is, relatively, inexpensive to produce the pickled seafood.

These and other important objects and advantages of the invention will be more particularly brought forth upon reference to the detailed description of the invention and the appended claims.

THE DETAILED DESCRIPTION OF THE INVENTION

This invention is directed to the pickling of a seafood and which seafood may be selected from the group consisting of the crustacea, the mollusks and fish.

The seafood is first washed, preferably, with warm water. It may be desirable to further process the seafood by washing with a rinse solution. In following Table I, rinse solution, there is illustrated a rinse solution which I have found to be satisfactory and which comprises a mixture of water and salt and the seafood. For example, on a volume basis, there may be 256 volumes of water; 64 to 256 volumes of seafood; and, 4 to 16 volumes of salt. This aqueous mixture of water, seafood and salt is heated and boiled for approximately 20 minutes. There may form a residue which floats on top of the aqueous mixture. The seafood can be removed from the aqueous mixture so as to leave the aqueous mixture and the residue. The seafood, either rinsed or unrinsed, may be treated in a pickling solution, see Table II. The pickling solution may comprise water, 160 parts by volume; a sweetening agent, 10 to 40 parts by volume; a preservative, 10 to 40 parts by volume; a flavoring agent, one to 4 parts by volume; and, a seasoning, 1 to 6 parts by volume.

The sweetening agent may be sugar or honey. Possibly, a synthetic sweetening agent, which is acceptable to the public, may be used. The preservative can be salt such as sodium chloride. It is possible to use a lesser amount of preservative such as sodium benzoate. If sodium benzoate is used, the volume would not be in the range of 10 to 40 parts but would be more in the range of ½ of 1 part to one part of sodium benzoate. A typical flavoring agent which may be used is vinegar (acidic acid) or lemon juice or an acid such as citric acid or tartaric acid. There are a number of available seasonings such as Worcestershire Sauce, A-1 Sauce, paprika, hot red peppers, cayenne pepper, to name a few.

In packing the pickled seafood into the container there may be placed small wedges of onion in the bottom of the container. Then, a layer of the pickled seafood may be placed on top of the onions and a few small chunks of green pepper placed on top of the pickled seafood. This can be repeated with a layer of onions, pickled seafood and green pepper until the jar is nearly full. Then, to fill the jar, there may be placed two hot peppers such as chili peppers or tippini peppers, and a pickling spice such as regular dill or cloves or peppercorns, and a bay leaf. The jar can be filled with pickling solution and sealed so as to have a cold pack for the pickled seafood. From experience, I have found that a cold pack pickled seafood will be able to be stored at ambient temperature for, approximately, 2 to 3 months.

Instead of having a cold pack of the pickled seafood, the container is sealed before processing and may be treated as a hot pack where the container and the pickled seafood and solution are heated under pressure in a pressure cooker for approximately 15 minutes. The shelf life, at ambient or room temperature, is such that the pickled seafood can be stored for, approximately, 3 years without refrigeration.

From experience, I have found that it is desirable to chill the pickled seafood before serving. For example, the pickled seafood in the container may be placed in a refrigerator for approximately 4 hours to 24 hours before serving.

As previously stated, the seafood can be selected from the group consisting of the crustacea, the mollusks and the fish. For example, the seafood to be pickled can be oysters, shrimp, scallops, clams, salmon, halibut, cod, red snapper, octopus, mussels, crab and the like.

There are some examples in the manner for treating seafood. These examples are presented in the following.

EXAMPLE I

There is prepared a pickling solution as outlined in above Table II. Then, the pickled seafood is placed in a container with wedges or slices of onions in the bottom, a layer of the seafood, and a few small pieces of green pepper. Then, there may be placed another layer of onions, a layer of seafood, and green pepper and this arrangement of alternate layers repeated. There is placed on top of the layers some hot pepper, such as chili peppers and tippini peppers, a regular dill, a pickling spice such as cloves or peppercorn and a bay leaf. Then, the pickling solution can be poured into the container and over these foods until covered. The container can be sealed as in a cold pack. The cold pack will be able to be stored under refrigeration for a period of 2 months to 3 months. The onions, pepper, spices function as flavoring agents and as seasoning agents.

EXAMPLE II

As an alternative to the process of Example I there may be prepared a Rinse Solution according to Table I. The seafood in the quantity indicated in Table I is heated and the rinse solution boiled for 20 minutes. The seafood is then removed from the rinse solution to form a rinsed seafood. The rinsed seafood can be placed in the pickling solution as outlined in above Example I and the steps of Example I repeated to form a cold pack pickled seafood.

EXAMPLE III

The preparation of the pickled seafood, oysters, shrimp, scallops, clams, crab and the like, was processed as in above Example I, but with one main different step in the process. After the pickled seafood was packed into the container with the onions, green pepper, pickling spices and other additives, the container and contents were sealed and placed in a hot pack for 15 minutes such as in a water bath in a pressure cooker and heated for 15 minutes. Then, after cooling, the container and contents were taken from the hot pack. The pickled seafood after the hot pack treatment can be stored, approximately, for 3 years at the room temperature or ambient temperature.

EXAMPLE IV

In this Example, the seafood, oyster, is processed as in the above Example II. There is one main difference between the subject matter in this Example IV and the above Example II in that in this Example the pickled seafood is hot packed as explained in above Example III. More particularly, in this Example, after the pickled seafood has been placed in the container with the onions, peppers, pickling spices and bay leaf, the container and the contents are sealed and are placed in a pressure cooker and heated under pressure for a period of 15 minutes. After cooling, the container and contents are removed from the pressure cooker. The container and contents can be stored for, approximately, 3 years at room temperature or ambient temperature.

The A. I. Sauce is a registered trademark and manufactured by Heublein, Inc., Hartford, Conn. 06101, and contains water, tomato paste, distilled vinegar, corn syrup, raisins, salt, herbs and spices, orange base, orange peel, caramel, dehydrated garlic and dehydrated onions.

The Worcestershire Sauce is a product of Lea & Perrins, Inc., Fair Lawn, N.J., 07410 and comprises vinegar, water, molasses, sugar, soy, anchovies, tamarinds, onions, garlic, eschalots, salt, spices and flavoring.

For a patent to be granted, the requirements of 35 USC 101 and 35 USC 103 must be satisfied.

35 USC 101 states:

"Whoever invents or discovers any new and useful process, machine, manufacture, or composition of matter, or any new and useful improvement thereof, may obtain a patent therefor, subject to the conditions and requirements of this title."

The applicant considers that the subject invention is new and the applicant does not know of the preparation of pickled seafood and, especially, pickled oysters by anyone else according to teachings similar to the applicant's teachings. Further, the applicant does not know of pickled seafood and, especially, pickled oysters, which can be stored at room temperature or ambient temperature for a period of approximately three years.

The applicant considers the subject invention to be useful as the applicant, as well as some friends of the applicant, have enjoyed eating the pickled seafood and, especially, pickled oysters. Further, I believe that, commercially, the pickled seafood and, especially, pickled oysters can be prepared and sold at appropriate outlets.

35 USC 103 states:

"A patent may not be obtained though the invention is not identically disclosed or described as set forth in section 102 of this title, if the differences between the subject matter sought to be patented and the prior art are such that the subject matter as a whole would have been obvious at the time the invention was made to a person having ordinary skill in the art to which said subject matter pertains. Patentability shall not be negatived by the manner in which the invention was made."

I consider that the subject matter of this invention is not obvious, as I have worked in commercial eating establishments and restaurants and have never heard of pickled seafood and, especially, oysters prepared in this manner or in a manner similar to the process I employ in preparing the pickled seafood. Therefore, I think that the subject matter of this invention is unobvious in view of my knowledge of cooking and associated arts.

TABLE I

| RINSE SOLUTION | |
|---|---|
| COMPONENT | VOLUME (Range) PARTS |
| Water | 256 |
| Seafood | 64 to 192 |
| Salt | 4 to 16 |

TABLE II

| PICKLING SOLUTION | |
|---|---|
| COMPONENT | VOLUME (Range) PARTS |
| Water | 160 |
| Sweetening Agent | 10 to 40 |
| Preservative | 10 to 40 |
| Flavoring Agent | 1 to 4 |
| Seasoning | 1 to 6 |
| Seafood | 90 to 130 |

From the foregoing disclosure of my invention, what I claim is:

1. A method for preparing pickled oysters which comprises:
   a. preparing a brine solution consisting essentially of 256 volumes of water to about 4 to 16 volumes of salt;
   b. adding to said brine solution from 64 to 256 volumes of oysters;
   c. boiling the mixture of brine and oysters for about 20 minutes;
   d. removing the cooked oysters from the brine;
   e. preparing as a pickling solution an aqueous mixture of 80 to 320 volumes of water, 64 to 256 volumes of a sweetening agent selected from the class consisting of sugars and synthetic sweetening agents, 1 to 6 volumes of a flavoring agent selected from the group consisting of acetic, citric and tartaric acids, 1 to 4 parts by volume of one or more seasoning spices, and a preservative selected from the group consisting of salt or sodium benzoate, wherein about 10 parts to 40 parts by volume of salt, or ½ to 1 part by volume of sodium benzoate is employed;
   f. on removal from the brine in step $d$, the further steps consisting of placing the cooked oysters in a container, placing onions, and peppers on pickling spices in the container, arranging the onions and peppers in layers with the oysters; and
   g. thereafter the steps comprising filling the container with pickling solution, and sealing the container.

\* \* \* \* \*